No. 875,986. PATENTED JAN. 7, 1908.
T. L. DERR.
GAGE COCK.
APPLICATION FILED APR. 1, 1907.
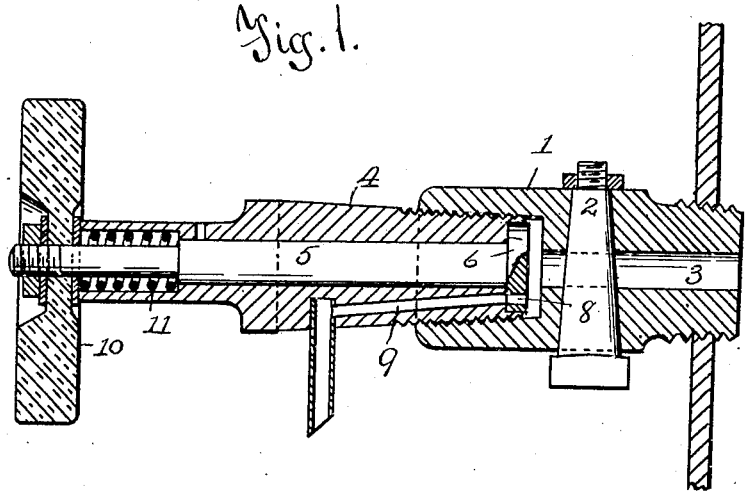
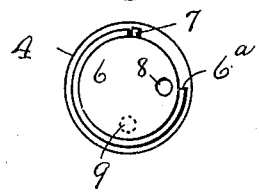
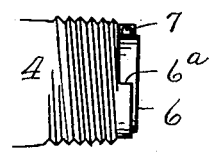
Thomas L. Derr, Inventor
Witnesses
J. O'R Kelly
N. J. Hill
By E. A. Kelly, Attorney

UNITED STATES PATENT OFFICE.

THOMAS L. DERR, OF READING, PENNSYLVANIA, ASSIGNOR OF ONE-HALF TO ROBERT H. DENNISON, OF READING, PENNSYLVANIA.

GAGE-COCK.

No. 875,986.   Specification of Letters Patent.   Patented Jan. 7, 1908.

Application filed April 1, 1907. Serial No. 365,693.

*To all whom it may concern:*

Be it known that I, THOMAS L. DERR, a citizen of the United States, residing at Reading, in the county of Berks and State of Pennsylvania, have invented certain new and useful Improvements in Gage-Cocks, of which the following is a specification.

This invention relates to improvements in gage cocks and the object is to provide a construction which will permit the gage cock to be removed from the boiler while under steam pressure, without inconvenience or annoyance.

The invention comprises a socket member, adapted with a shut off valve, adapted to enter the boiler and a valve casing adapted to enter said socket member.

The invention is more fully described in the following specification and clearly illustrated in the accompanying drawing, in which:—

Figure 1 is a central, longitudinal sectional view of my device in position. Fig. 2 is an end view of the valve casing. Fig. 3 is a top view of the end of the valve casing.

The numeral 1 designates the socket. This socket is screw threaded externally at one end where it enters the boiler. Its opposite end is screw threaded internally and adapted to receive the valve casing. A shut off valve 2 is located in this socket and an opening 3 leads through said socket from the boiler, past the shut off valve, into the valve casing 4. This valve casing 4 is provided with a central longitudinal stem 5 on the end of which is located a valve 6 adapted to seat against the end of the casing 4, which end is ground to form a valve seat. The end of the casing, beside this valve seat, is cut away about one-quarter of its circumference, as shown at 6ª and the valve 6 is provided with a pin 7 projecting from the periphery thereof and adapted to travel in this space 6ª and to stop the movement of the valve, allowing but a quarter turn in either direction. This valve is also provided with an opening 8, which opening is adapted to register with an opening 9 in the casing below the central opening therein. This opening is the steam outlet. The valve stem is provided with the usual handle 10 at the end opposite the valve and a coiled spring 11 is provided in the rear end of the valve casing, which surrounds the vale stem and tends to keep the valve seated.

It is evident that a quarter turn of the handle 10 will open or close the cock as the valve opening 8 either registers with or closes the opening 9 in the casing.

It is also evident that when it is desired to remove the gage cock, it is merely unscrewed from the socket, after the shut off valve therein has been closed, without danger or inconvenience of any kind. The shut off valve being normally open.

It will also be noted that I use no packing whatever in my construction and that the danger of leakage is not increased by the omission thereof.

Having thus fully described my invention what I claim and desire to secure by Letters Patent is:—

In a gage cock a two-part casing, one of which is in the form of a socket adapted to enter a boiler and is provided with a shut-off valve, and the other being adapted to screw into said socket and provided with a steam outlet and having at its inner end a segmental flange, a valve housed within the socket and having a single opening adapted to register with the steam outlet, a pin mounted upon the valve and lying between the ends of the segmental flange, a valve stem, and a spring back handle secured to said stem, said pin and segmental flange adapted to limit the movement of the valve to a fraction of a revolution.

In testimony whereof I affix my signature, in presence of two witnesses.

THOMAS L. DERR.

Witnesses:
ED. A. KELLY,
J. O'R. KELLY.